Nov. 6, 1945. C. C. KOELN Re. 22,690

REMOVABLE DRILLING BIT

Original Filed March 15, 1943

INVENTOR
C. C. KOELN
BY P. H. Lampkere
ATTORNEY

Reissued Nov. 6, 1945

Re. 22,690

UNITED STATES PATENT OFFICE 22,690

REMOVABLE DRILLING BIT

Carl C. Koeln, St. Louis County, Mo.

Original No. 2,337,720, dated December 28, 1943, Serial No. 479,185, March 15, 1943. Application for reissue October 14, 1944, Serial No. 558,685

18 Claims. (Cl. 255—61)

My invention relates to a well drilling apparatus, and more particularly to a drilling bit therefor.

One of the objects of my invention is to produce an improved drilling bit and shaft attaching means for a rotary drilling apparatus so that the bit can be readily attached to and removed from the end of the drilling shaft without the necessity of pulling the drilling shaft from the hole being drilled.

Another object of my invention is to so construct a removable drilling bit of the type referred to that certain cutters thereof will be automatically adjusted to permit the cutting of the central part of the bottom of the hole being drilled when the bit is caused to be attached to the drilling shaft and automatically moved to a position permitting the bit to slide on the drilling shaft when it is to be removed.

Figure 1:
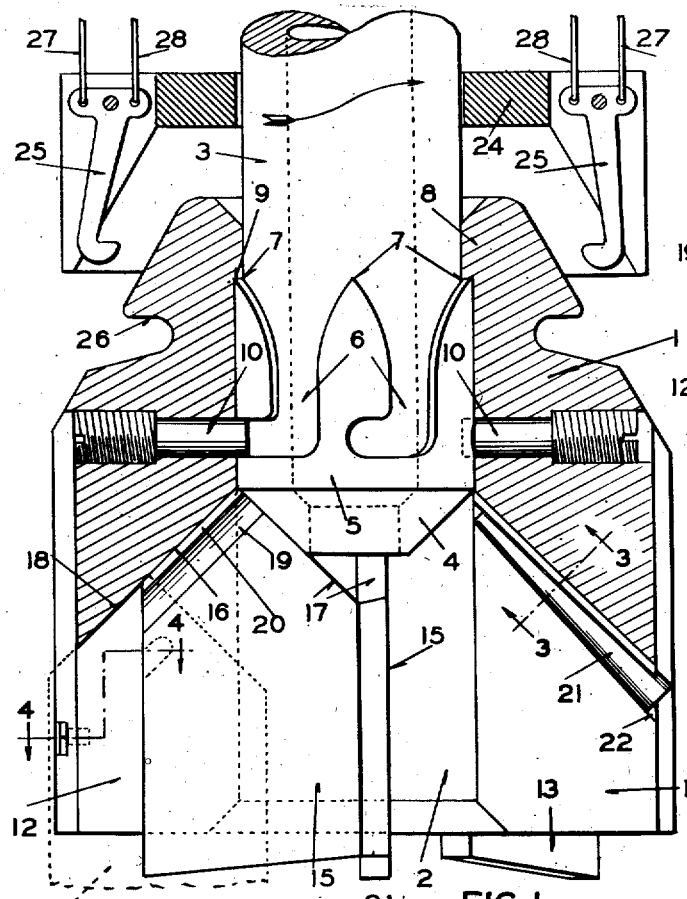
Figure 3:
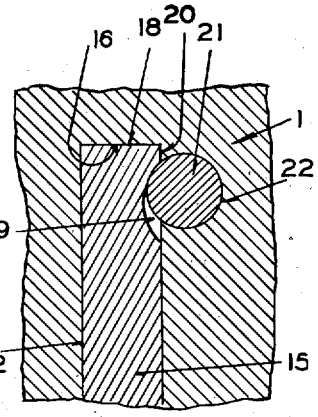
Figure 4:
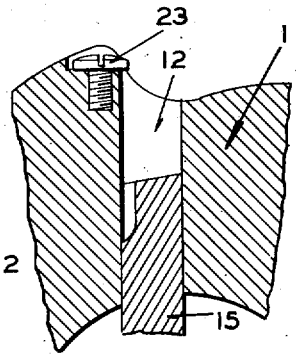
Figure 2:
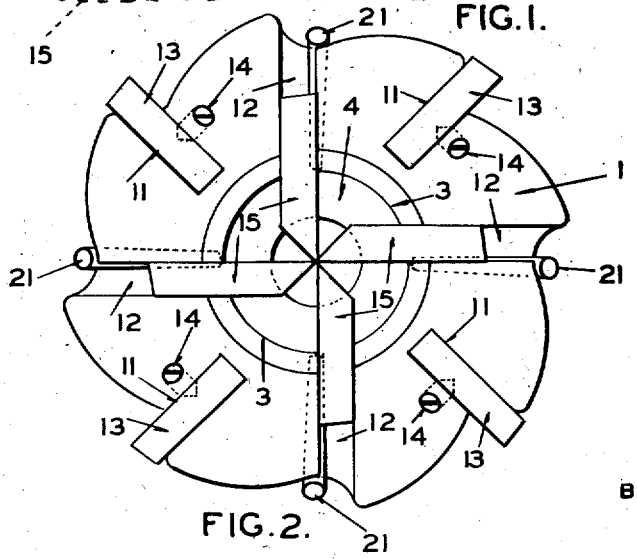
Figure 5:
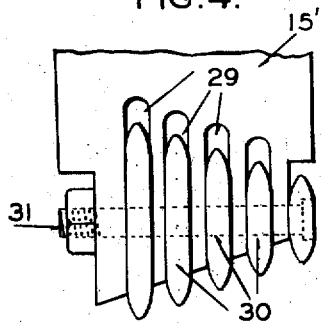

Other objects of my invention will become apparent from the following description taken in connection with the accompanying drawing in which Figure 1 is a vertical sectional view of my improved drilling bit showing it in operative position on the end of a drilling shaft, said view also showing the device employed to lower and lift the bit from the bottom of the hole; Figure 2 is a bottom view of the bit; Figures 3 and 4 are sectional views taken on the lines 3—3 and 4—4, respectively, of Figure 1; and Figure 5 is a view of a different type of cutter which can be employed with the bit.

Referring to the drawing in detail, I have disclosed my invention embodied in a drilling bit for use with a rotating drilling shaft, but such is by way of example only as the bit may be associated with rotating elements other than a rotating drilling shaft which is rotated from the top of a well. The numeral 1 indicates the drilling bit body, the peripheral surface of which has an irregular contour as shown in Figure 2. This body is provided with a central bore 2 which permits it to be slid over the usual hollow drilling shaft or stem (not shown) of the drilling apparatus. The lower end of this drilling shaft has secured to its end by threads a specially constructed short hollow shaft 3 forming part of the means for removably attaching the drilling bit body. The shaft 3 is provided with a beveled end surface 4, and adjacent this end the shaft is provided with an enlargement 5 having a portion of its surface cut away to form right angle slots 6. The upper ends of these slots have flared open ends with the side wall portions of the adjacent slots converging to form apexes 7. The internal diameter of bore 2 is the same as the external diameter of the enlargement 5, except at its upper end 8 which is of decreased diameter in order to fit the portion of shaft 3 above the enlarged portion. Between portion 8 and the main part of bore 2 there is formed a shoulder 9 which is adapted to engage the apexes 7 of the enlarged portion 5 on the lower end of the shaft. The angular slots 6 are shown as being four in number, and cooperating with these slots are the inner ends of pins 10 carried by the body portion. These pins, together with the angular slots, form a bayonet type of joint, preventing any relative axial movement between the body of the bit and the shaft 3 when the pins are positioned in the lateral legs of the slots. These pins also provide a driving connection between the short shaft 3 and the body of the bit so that the bit can turn with the shaft when the shaft rotates in the direction indicated by the arrow.

The lower end of the body of the drilling bit is provided with alternate long and short radially positioned slots 11 and 12 extending in a longitudinal direction. In the short slots 11 are positioned cutters 13 in the form of blades which are held in the slots by screws 14. The outer edges of these cutters extend slightly beyond the periphery of the body member and provide a cutting edge for forming the wall of the hole, whereas the bottom edges of the cutters 13 provide the cutting means for cutting away the earth substance at the bottom of the hole adjacent the side wall thereof.

In each of the long slots 12, which extend completely through the wall of the body, is positioned a slidable cutter 15 provided on their upper ends with converging edges 16 and 17. These edges are at right angles to each other with each being at an angle of forty-five degrees with the vertical axis of the cutter. Each slot 12 is so cut in the body of the bit that the bottom wall 18 thereof is at a forty-five degree angle with the axis of the bit body, thus providing a surface with which the edge 16 on the cutter can engage. One surface of the cutter is provided with a recess 19 extending parallel with the edge 16 and forming therewith a rib 20. Received in said recess 19 is a portion of a tapered pin 21 which is fitted into a tapered hole 22 in the body at one side of the slot 12. This tapered hole is so constructed that when the tapered pin is positioned therein the top of the pin surface, where it projects into the slot, will be parallel with the bottom wall 18 of the slot. Thus when the cutter is positioned in the slot, the rib 20 will be confined between the pin and the end of the slot and will thus hold the cutter from falling out of the slot. The construction also permits the cutter to slide radially outwardly and downwardly in the slot or inwardly and upwardly in the slot with the edge 16 always cooperating with the angular bottom wall 18 of the slot. In order that the cutter will be prevented from sliding out of the slot in a radial direction when the bit is out of the hole, the bit body carries a screw 23 (see Figure 4) for cooperation with the outer edge of the cutter.

When in its outermost position against the head of the screw, the cutter 15 will not project into the bore of the bit body. The outermost position of the cutter is shown in the dotted line position in Figure 1. When in this position, it is apparent that the cutters 15 will not interfere with sliding the bit up and down on the shaft 3 or the drilling shaft to which it is connected. When the cutter is in its innermost position, approximately half of its width will project into the bore 2 of the bit body. The cutters are prevented from moving further into this bore by the upper edge 17 abutting the beveled surface 4 on the bottom of the short shaft 3. When the bit is in the operative position, the cutters 15 will assume their innermost positions and thus the lower edges of the cutters will act as cutting means on the central portion of the bottom of the hole. Thus it is seen that all of the bottom of the hole will be acted upon by the cutters 13 and 15.

It is to be noted that because of the relationship of the cutters 13 with the peripheral contour of the body member, the forward side edges of the cutters 13 are open to act on the side wall of the hole and the backs of the cutters are well supported by the body. The contour of the outer surface of the bit body provides space between the body and the wall of the hole for the cuttings to be carried upward by the fluid which is forced downwardly through the drilling shaft and the short shaft 3 into the bottom of the hole being drilled, which is common practice during drilling.

When in the operative position on the end of the drilling shaft, the bit is shown as in Figure 1. If it is desired to remove the bit, a special tool in the form of a retrieving ring is employed. This ring is shown in Figure 1 and comprises an annular element 24 carrying pivoted hooks 25. These hooks are adapted to cooperate with an annular ledge 26 provided on the upper end of the bit body. Each hook is controlled by two cords or cables 27 and 28 which also provide the means for raising the bit from the bottom of the well and also lowering it into the bottom of the well. When the bit is to be removed, the retrieving ring is lowered from the top of the well to where it engages the top of the body of the bit. The hooks can then be engaged with the ledge 26 by pulling on the cords 28.

If the drilling shaft is now rotated in the direction opposite that indicated by the arrow, there will be relative movement between the short shaft 3 and the body member and the pins 10 will be moved into alignment with the vertical portions of the slots 6. If the retrieving ring is now pulled upwardly by the cords 28, the body of the bit will also be pulled upwardly relatively to the short shaft 3. As the body of the bit moves upwardly, the cutters 15 will be forced outwardly and downwardly in their slots by the wedging action between the angular edge 17 and the beveled surface on the bottom of the shaft 3. When the cutters are moved sufficiently outwardly that no portion thereof extends into the bore 2, the bit will be free to move upwardly and be removed from the hole by sliding it over the drilling shaft. When the bit reaches the top of the hole, it can be removed by merely detaching a joint of the drilling shaft, and then a new bit substituted therefor. When the new bit is put on, the cutters 15 will be at their outermost positions, thus freeing the bore 2 of interference by the cutters. The hooks of the retrieving ring are now attached to the new bit and said bit lowered into the well by the cords 28. When the bit reaches the short shaft 3 on the bottom of the drilling shaft, the pins 10 will find their way out into the flared vertical portions of the slots 6. The shaft is now given a turn in the direction indicated by the arrow, thereby causing the pins to be positioned in the lateral portions of the slots to lock the bit against relative longitudinal movement with respect to the short shaft 3. When the bit and the drilling shaft are now lowered into the bottom of the hole, the cutters 15 will engage the bottom of the hole and be forced upwardly and inwardly to their operative positions. The drilling operation can then be resumed as soon as the ring is brought back to the top of the hole.

It is to be noted from the above description of my improved drilling bit that the said bit can be removed and replaced by a new bit in a very short time without the necessity of pulling the entire drilling shaft, which takes a long period of time even under the best conditions. This not only saves time but also reduces labor cost as the bit can be changed by only one person. The bit is so constructed that all parts of the bottom of the hole will be cut by the cutters when the bit is in the operative position. The bit permits the usual drilling methods to be employed, whereby the cuttings from the cutters can be forced upwardly and out of the hole by the liquid being forced down through the hollow drilling shaft. It is also to be particularly noted that the drilling bit is very sturdily constructed and the the cutters or blades are all fully supported in the body of the bit. The slidable cutters 15 will be maintained in their inner positions at all times as outward movement of the cutters is prevented by the angular edge 16 cooperating with the angular bottom surface of the slot. However, when the bit is to be removed, these cutters 15 will readily slide to their outer positions in the slots and the free bore 2 so that the bit can be pulled up the drilling shaft.

The cutting portion of the cutter need not be the edge of a blade as other types of cutters can be employed with the bit, as, for example, a rotary type. In Figure 5, there is disclosed a cutter 15′, the upper portion of which is the same as the previously described cutter 15 and capable of being mounted in the bit body in a like manner. The lower portion of the cutter is provided with slots 29 of varying length in which are positioned wheels or discs of different diameters. These wheels or discs are rotatably mounted on a shaft 31, so that when the bit is rotated, they will cut or grind the earth material. When the cutter 15′ is employed, similar cutters are substituted for the fixed cutters 13 so that the whole bottom of the hole will be worked upon. Preferably, there will be two cutters capable of radial sliding movement and two fixed cutters. The wheels or discs of the different cutters should be spaced so that there will not be "tracking."

Being aware of the possibility of modifications in the particular structure herein described without departing from the fundamental principle of my invention, I do not intend that its scope be limited except as set forth by the appended claims.

Having fully described my invention, what I claim as new and desire to secure by Letters Patent of the United States is:

1. In a drilling apparatus, a rotary drilling shaft, a drilling bit body slidable on the shaft, means associated with the end of the drilling shaft and with the bit body for attaching the body to the lower end of the shaft so as to be rotated therewith while the lower end of the shaft remains adjacent the bottom of the hole being drilled and for so detaching the body that it will be free to be moved relatively axially of the shaft to the top of the hole, a cutter, means for mounting the cutter on the body for movement in a single plane only, and means for causing the cutter to be moved to a position to operate on the bottom of the hole axially below the end of the shaft when the body is attached to the lower end of the shaft.

2. In a drilling apparatus, a rotary drilling shaft, a drilling bit having a body provided with a bore receiving the shaft, cooperating means on the bit body and the lower end of the shaft for attaching the bit to the shaft so as to rotate therewith and for detaching said bit by a relative rotation between it and the shaft so as to permit said bit to be free to be moved relatively axially with respect to the shaft and out of the hole being drilled without the necessity of removing the shaft from said hole, cutters, means for mounting the cutters on the bit body for movement in a radial plane only, means for bringing about the bodily moving of the cutters radially into a part of the bore when the bit is attached to the shaft and the cutters are caused to engage the bottom of the hole, and means for moving the cutters out of the bore when the bit body is moved upwardly on the drilling shaft.

3. In a drilling apparatus, a rotary drilling shaft, a drilling bit having a body provided with a bore receiving the shaft, cooperating means on the bit body and the lower end of the shaft for attaching the bit to the shaft so as to rotate therewith and for detaching said bit by a relative rotation between it and the shaft so as to permit said bit to be free to be moved relatively axially with respect to the shaft and out of the hole being drilled without the necessity of removing the shaft from said hole, cutters, means for mounting the cutters on the bit body for movement in a single plane only, means for bringing about the moving of the cutters into a part of the bore when the bit is attached to the shaft and the cutters are caused to engage the bottom of the hole, means for moving the cutters out of the bore when the bit is moved axially of the shaft, and means for moving the bit axially of the shaft.

4. In a drilling apparatus, a rotary drilling shaft, a drilling bit having a body provided with a bore for receiving the shaft, cutters, means for mounting the cutters in the body for radial sliding movement into and out of the bore, detachable connecting means associated with the bit body and the end of the shaft permitting said body to be rotated with the shaft in one direction of rotation thereof and to be so conditioned by a relative rotation between the shaft and the bit body as to permit the body to be free to be moved upwardly on the shaft and out of the hole, means for causing the cutters to be so positioned by a substantially radial movement as to extend into the bore of the body when the bit is operatively connected to the lower end of the shaft, and means for moving the cutters radially out of the bore when the bit is moved upwardly relatively to the shaft.

5. In a drilling bit and drilling shaft construction permitting removal of the bit from a hole without removal of the shaft, a bit having a body provided with a bore for receiving the shaft, means on the bit and shaft preventing the bit from passing over the end of the shaft, interengaging means for connecting the bit to the shaft so as to be rotated therewith in one direction, means for disengaging the interengaging means by a relative rotation between the shaft and the bit to thus free the bit for upward axial movement relative to the shaft, fixed cutters carried by the body of the bit and extending below the body between its outer surface and the bore, other cutters, means for mounting the other cutters on the bit body for movement in a single plane into and out of a portion of the bore, means for causing the movable cutters to be moved into the bore when the bit is attached to the shaft and the cutters are caused to engage the bottom of the hole, cooperating means on the lower end of the shaft and the movable cutters for moving the cutters out of the bore when the bit is moved axially on the shaft.

6. In a drilling bit and drilling shaft construction permitting removal of the bit from a hole without removal of the shaft, a bit having a body provided with a bore for receiving the shaft, means on the bit and shaft preventing the bit from passing over the lower end of the shaft, interengaging means for connecting the bit to the shaft so as to be rotated therewith in one direction, means for disengaging the interengaging means by a rotation of the shaft in the opposite direction and relatively to the bit to thus free the bit for upward axial movement relative to the shaft, substantially radial slots through the body of the bit between its outer surface and the bore and open at the bottom of the body, the closed ends of said slots being at an acute angle to the axis of the body, cutter members in the slots, each of said members having such an angular edge as to cooperate with the closed end of its slot to thereby cause the cutter member to be radially moved into a portion of the bore when the bottom of the cutter engages the bottom of the hole, means for slidably holding each cutter member in its slot, and cooperating means on each cutter member and the end of the shaft for moving the cutter members out of the bore when the bit body is moved axially up the shaft.

7. In a drilling bit and drilling shaft construction permitting removal of the bit from a hole without removal of the shaft, a bit having a body provided with a bore for receiving the shaft, means for connecting and disconnecting the bit to the lower end of the shaft while the shaft remains in the hole being drilled, substantially radial slots through the body of the bit between its outer surface and the bore and open at the bottom of the body, the closed ends of said slots being at an acute angle to the axis of the body, cutters having portions in the slots, each of said cutters having such an angular edge as to cooperate with the closed end of its slot to thereby cause the cutter to be radially moved into a portion of the bore when the bottom of the cutter engages the bottom of the hole, and cooperating means on each cutter and the end of the shaft for moving the cutters out of the bore when the bit body is moved axially up the shaft.

8. In a drilling apparatus, a rotary drilling shaft, a drilling bit having a body provided with a bore for receiving the shaft, means associated with the end of the shaft and with the bit body for attaching the bit to the lower end of the shaft so as to be rotated therewith while the lower end of the shaft remains in the hole being drilled and for so detaching the bit that it will be free to be moved over and relatively axially of the shaft to the top of the hole, and a cutter mounted on said bit body and comprising a member mounted for movement relatively to the bit body and in a single plane only into and out of a portion of the bore and cutting elements rotatably mounted on the member.

9. In a detachable bit for a drilling shaft a bit body having a bore for reception of the shaft, a radial slot in the body, a cutter having a portion received in the slot for radial movement, and means for maintaining the cutter portion in the slot and permitting its radial sliding movement into and out of a portion of the bore, said last named means comprising a rib element for engaging a part of the cutter portion and having a tapered portion, and a tapered opening in the body for receiving the tapered portion of the element in a wedging fit.

10. In a drilling apparatus, a shaft, a drilling bit body having a shaft receiving bore for permitting the bit to be slid on the shaft and attached and removed from the lower end of said shaft without removing the shaft from the hole being drilled, means for attaching and detaching the body to the lower end of the shaft, and a cutter mounted on the bit body to move in a single plane only and arranged to move to a cutting position below the end of the shaft.

11. In a drilling apparatus, a rotary drilling shaft, a drilling bit body having a shaft receiving bore for permitting the bit to be slid on the shaft and attached and removed from the lower end of said shaft without removing the shaft from the hole being drilled, means for attaching and detaching the body to the lower end of the shaft, a cutter, means for mounting the cutter on the bit body for radial movement relative thereto, and means including cooperating means carried by the body and the cutter for bringing about a moving of the cutter into a position below the end of the shaft to cut the central part of the hole.

12. In a drilling apparatus, a shaft, a drilling bit body having a shaft receiving bore for permitting the bit to be slid on the shaft and attached and removed from the lower end of said shaft without removing the shaft from the hole being drilled, means for attaching and detaching the body to the lower end of the shaft, a cutter, means for mounting the cutter on the bit body for movement in a single plane only, and means including cooperating means carried by the bit body, the cutter and the end of the shaft for positioning the cutter beneath the bottom of the shaft by the single plane movement when the bit body is positioned at the lower end of the shaft and for moving the cutter from beneath the end of the shaft when the body is moved up the shaft.

13. In a drilling bit construction for association with a rotatable member carried on the end of a stem extending to the bottom portion of a well, a bit body arranged to slide on the stem, means associated with the bit body and the rotatable member for attaching the body to the rotatable member while the member remains in the hole being drilled and for so detaching the body that it will be free to be moved relatively to the rotatable member, a cutter, and means including means for so mounting the cutter on the bit body that it can have movement in a single plane only to assume a position below the end of the rotatable member and when so positioned can cut the bottom of the hole below said rotatable member.

14. In a drilling bit construction for association with a rotatable member carried on the end of a drill stem extending to the bottom portion of a well, a bit body, means associated with the bit body and the rotatable member for attaching the body to the rotatable member while the member remains in the hole being drilled and for so detaching the body that it will be free to be moved relatively to the rotatable member and the stem to the top of the well, a cutter, and means for so mounting the cutter on the bit body for radial movement that it can assume a position below the end of the rotatable member to cut the center of the hole when the bit body is attached to the rotatable member.

15. In a drilling bit construction for association with a rotatable member carried on the end of a stem extending to the bottom portion of a well, a bit body having a bore for sliding over the stem and provided with a longitudinal radially extending slot, means associated with the bit body and the rotatable member for attaching the body to the rotatable member while the member remains in the hole being drilled and for so detaching the body that it will be free to be moved relatively to the rotatable member and the stem to the top of the well, a cutter so movable mounted in the slot of the bit body that it can move radially and assume a position below the end of the rotatable member to cut the center of the hole when the bit body is attached to the rotatable member, and means for moving the cutter to the said position.

16. A slidable cutter for use with a hollow drilling bit body capable of sliding over and positionable on the lower end of a drill stem having a conical surface at its lower end and wherein the bit body has a longitudinally extending radial slot with an upper end surface at an acute angle to the body axis, said cutter comprising a flat body for sliding reception in the slot and provided on its upper end with converging edges both of which are at acute angles with the longitudinal axis of the cutter, one of said edges being arranged for engagement with the conical end surface of the stem and the other with the end surface of the slot, and means carried by the cutter for engagement with means on the bit body for slidably holding the cutter in the slot.

17. A slidable cutter for use with a hollow drilling bit body capable of sliding over a drilling stem while the stem remains in the well, said cutter comprising a flat body part provided with upwardly converging edges at its upper end each of which is at an acute angle with the longitudinal axis of the cutter, and a groove in one of its flat faced surfaces having an upper edge parallel with one of the converging edges.

18. A movable cutter for use with a hollow drilling bit body capable of sliding over a drilling stem having a conical surface at its end and wherein the bit body has a longitudinally extending radial slot through its body, said cutter comprising a flat body for sliding reception in the slot and provided at its upper end with means for engagement with means carried by bit body for mounting the cutter body in the slot for movement into the hollow portion of the bit body, said cutter also being provided with an edge above its bottom portion for engagement by the conical surface of the stem when the cutter is in the hollow portion of the bit body.

CARL C. KOELN.